Nov. 4, 1941.          C. R. DOTY          2,261,543
REMOTELY CONTROLLED PUNCH SYSTEM
Filed June 15, 1939          7 Sheets-Sheet 1
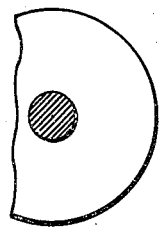
FIG. 1.
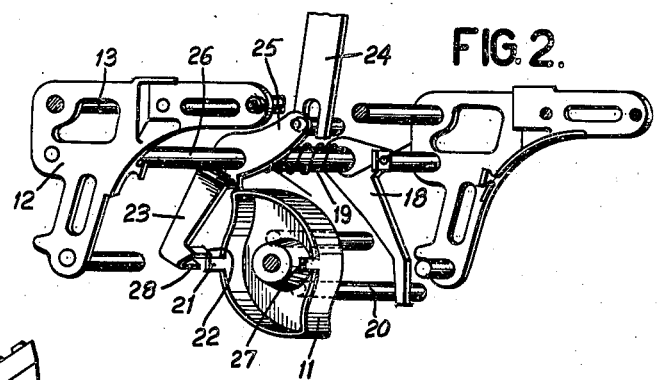
FIG. 2.
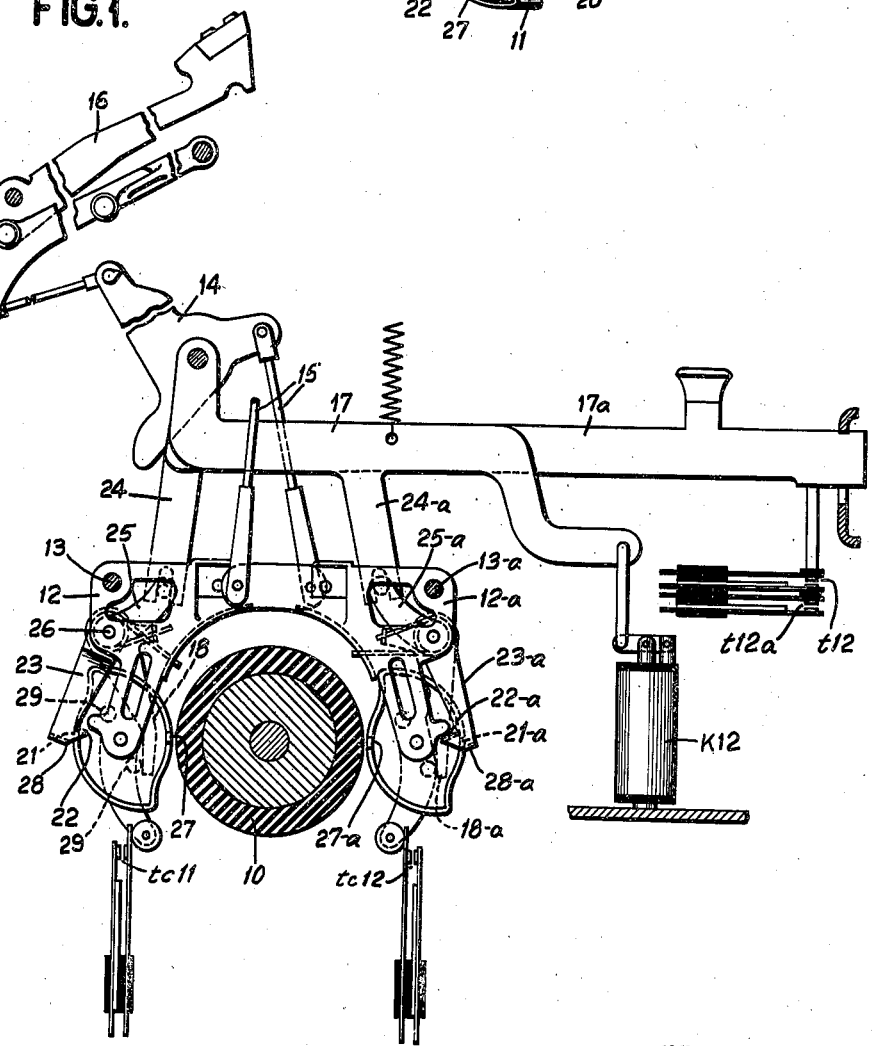
INVENTOR
Charles R. Doty
BY
W. M. Wilson
ATTORNEY Nov. 4, 1941.  C. R. DOTY  2,261,543
REMOTELY CONTROLLED PUNCH SYSTEM
Filed June 15, 1939    7 Sheets-Sheet 3

FIG. 5a.

INVENTOR
Charles R. Doty
BY
W. M. Wilson
ATTORNEY

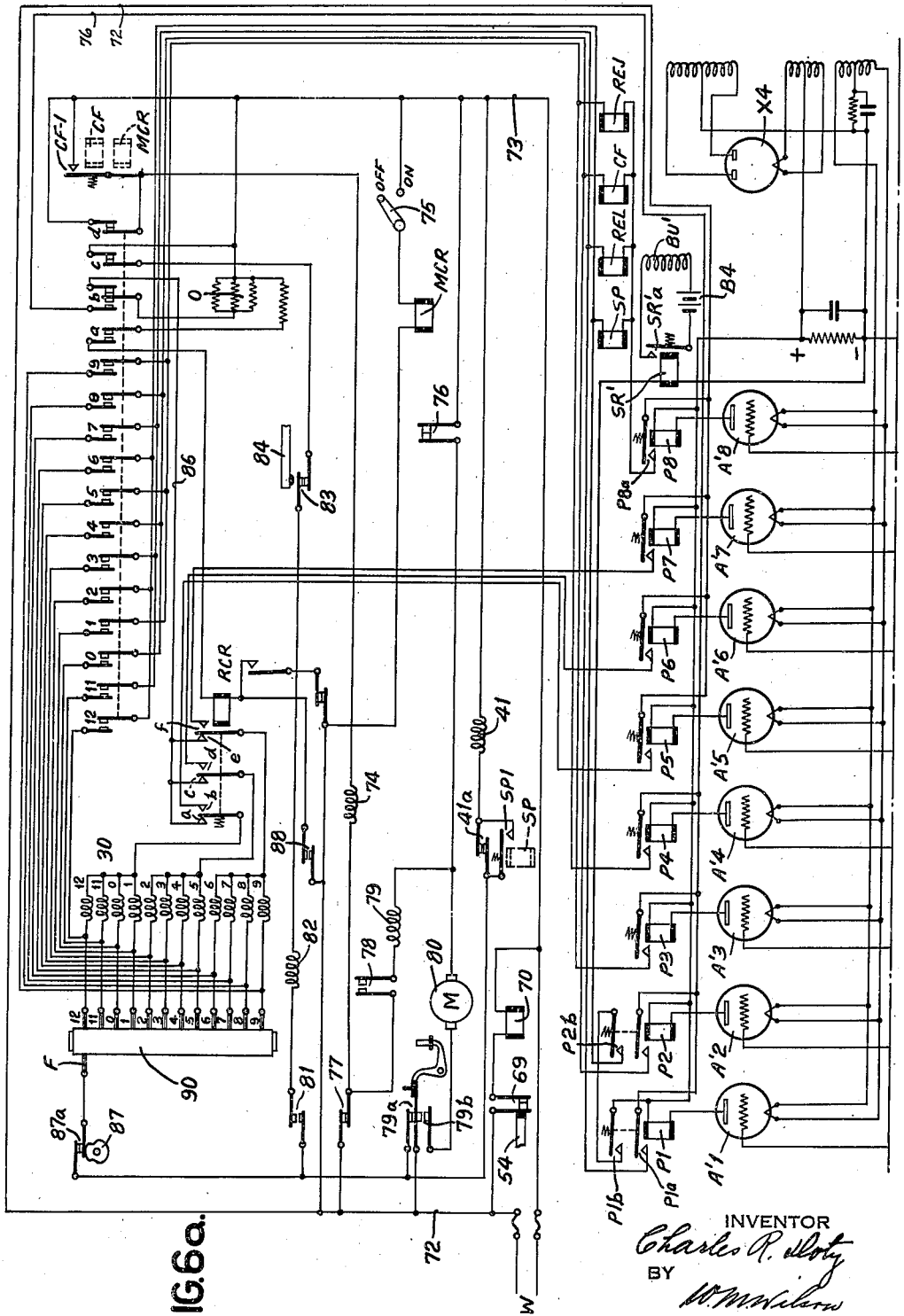

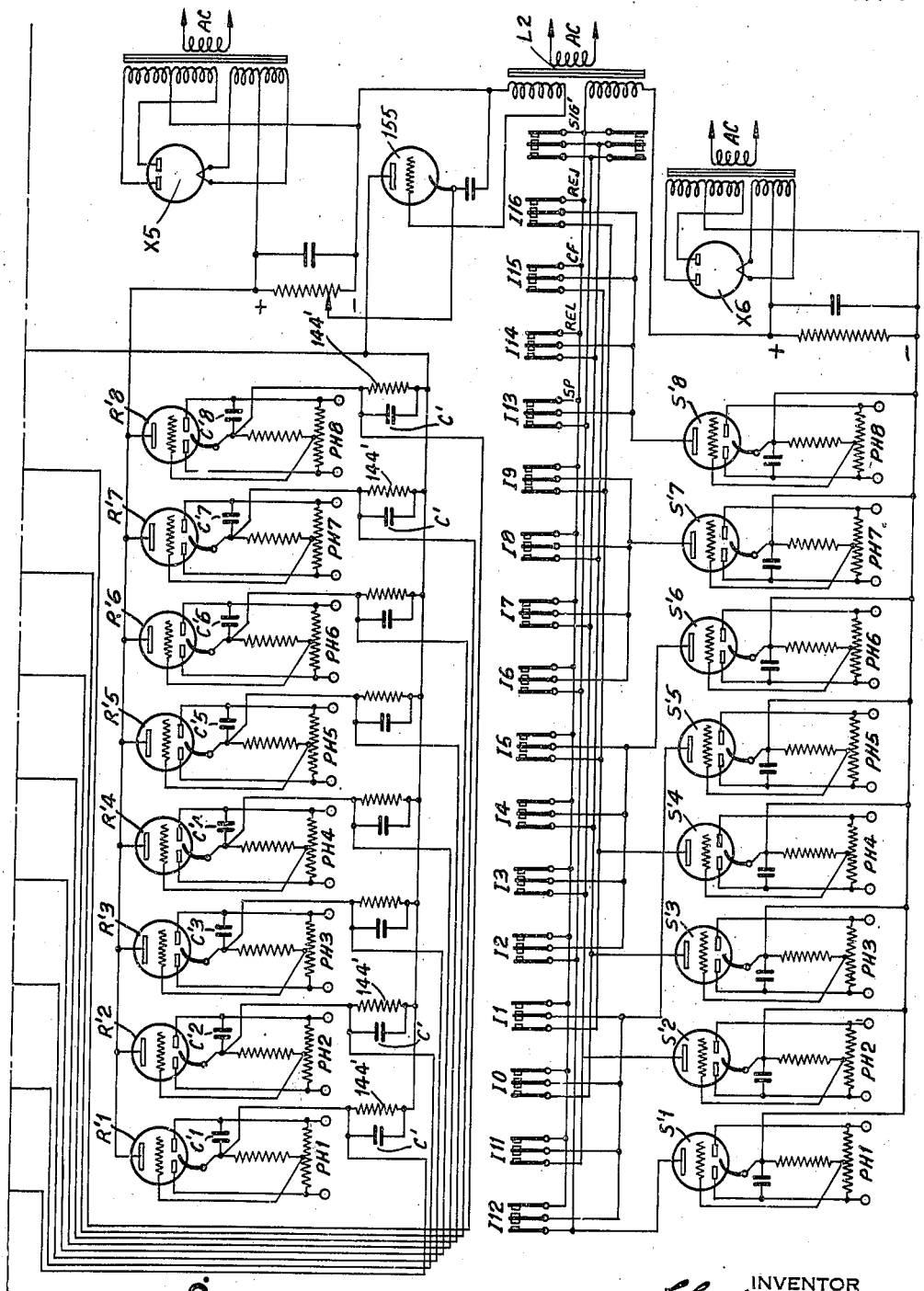

Nov. 4, 1941.  C. R. DOTY  2,261,543
REMOTELY CONTROLLED PUNCH SYSTEM
Filed June 15, 1939  7 Sheets-Sheet 7
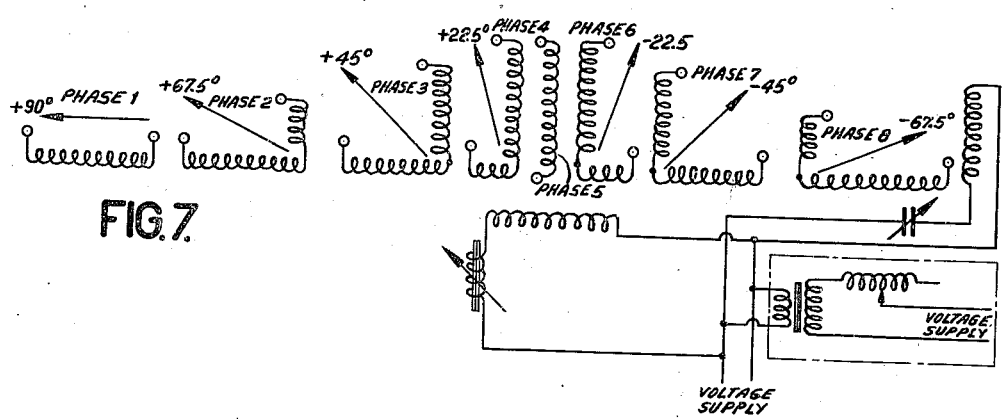
FIG. 7.
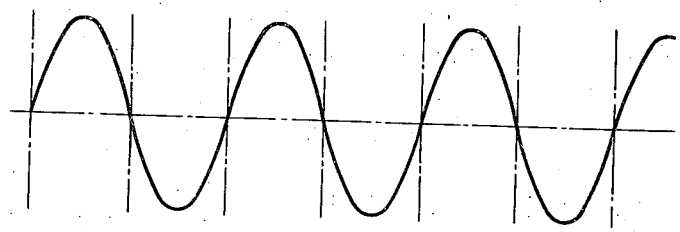
FIG. 8.
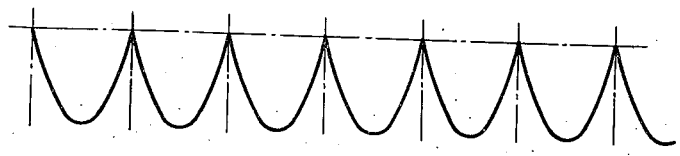
FIG. 8a.
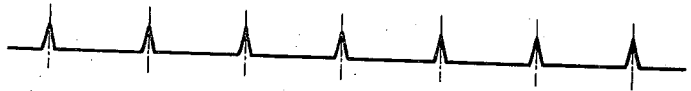
FIG. 8b.
FIG. 9.
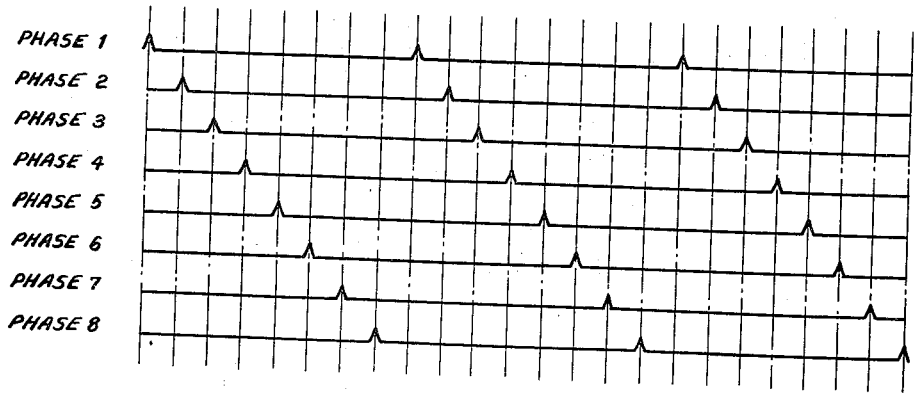
INVENTOR
Charles R. Doty
BY
W. M. Wilson
ATTORNEY Patented Nov. 4, 1941

2,261,543

UNITED STATES PATENT OFFICE 2,261,543

REMOTELY CONTROLLED PUNCH SYSTEM

Charles R. Doty, Yonkers, N. Y., assignor to International Business Machines Corporation, New York, N. Y., a corporation of New York Application June 15, 1939, Serial No. 279,283

10 Claims. (Cl. 178—4)

This invention relates to remotely controlled data recording systems and more particularly to a recording system of the check-back type wherein recording operations at a remote station are accompanied by the transmission of signals back to a controlling station for the purpose of verifying the accuracy of the recorded data.

It is the general object of the present invention to provide a novel data recording system having improved data verifying means for determining the correctness of the system at all times during its operation.

More specifically, it is the object of the invention to provide a remotely controlled recording system in which coded current signals of predetermined phase relationships are sent to a remote station to cause selective operation of a recording means, said recording means upon operation being adapted to set up further coded signals to be returned to a controlling station for verifying purposes.

Another object resides in the provision of the means whereby certain portions of the coded signal waves are utilized for transmission purposes in one direction and other portions of these waves are used for return transmission so as to permit check-back signals and control signals to operate concurrently over the system.

Still another object is to provide means at the primary station including a series of electronic discharge devices selected for operation in accordance with the data to be transmitted for modifying sine wave forms of current from a multi-phase source of supply into a series of repeating pulses, and means at the remote station responsive to said pulses in accordance with their different phases for operating a punching machine to perforate the data in a record card.

Broadly, the instant invention comprises contact closing means at the transmitting or controlling station which are effective to close the plate circuits of certain electronic discharge tubes to the transmission line according to a predetermined coding arrangement. Each tube is fed by a source of supply of a different characteristic phase relationship so that the signal waves impressed on the line upon operation of these tubes remain separable in accordance with their different phases. Similarly, at the receiving station a circuit arrangement is provided which comprises like tubes connected to a multi-phase source of supply corresponding to that at the transmitter. The receiving tubes are arranged to be selectively discharged according to the phase relationships of the incoming signals. Pulses established by the discharge of the latter tubes are amplified and sent to the operating magnets of a punching machine to effect the proper data perforations in a record card. Each operation of such punching machine selects another series of electronic discharge tubes for operation to impress signals representative of the recorded data on the line for re-transmission to the controlling station.

Condensers are provided in various portions of the tube circuits as will be explained hereinafter to cause the signal pulses to be effective only on alternate half cycles of the sine waves of current from each source of supply. Thus, if the signals from the transmitting station to the receiving station are maintained along the lower loops of the current waves, the signals in the reverse direction would be maintained along the upper loops of these waves to permit two-way transmission concurrently without interference. It may be well assumed that the characteristics of the current waves of the different sources of supply approximate sine waves and, although these waves are modified considerably by the action of the tubes as will be explained later, still the effect of the condensers is to suppress alternate half cycles thereof.

Other tube circuits are provided at the transmitting station for receiving the check-back signals and directing them to operate recording mechanism at that station for the purpose of verifying the system.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a sectional view of the typewriter recording mechanism at the transmitter.

Fig. 2 is a detail view of a portion of the operating mechanism shown in Fig. 1.

Figure 5B:
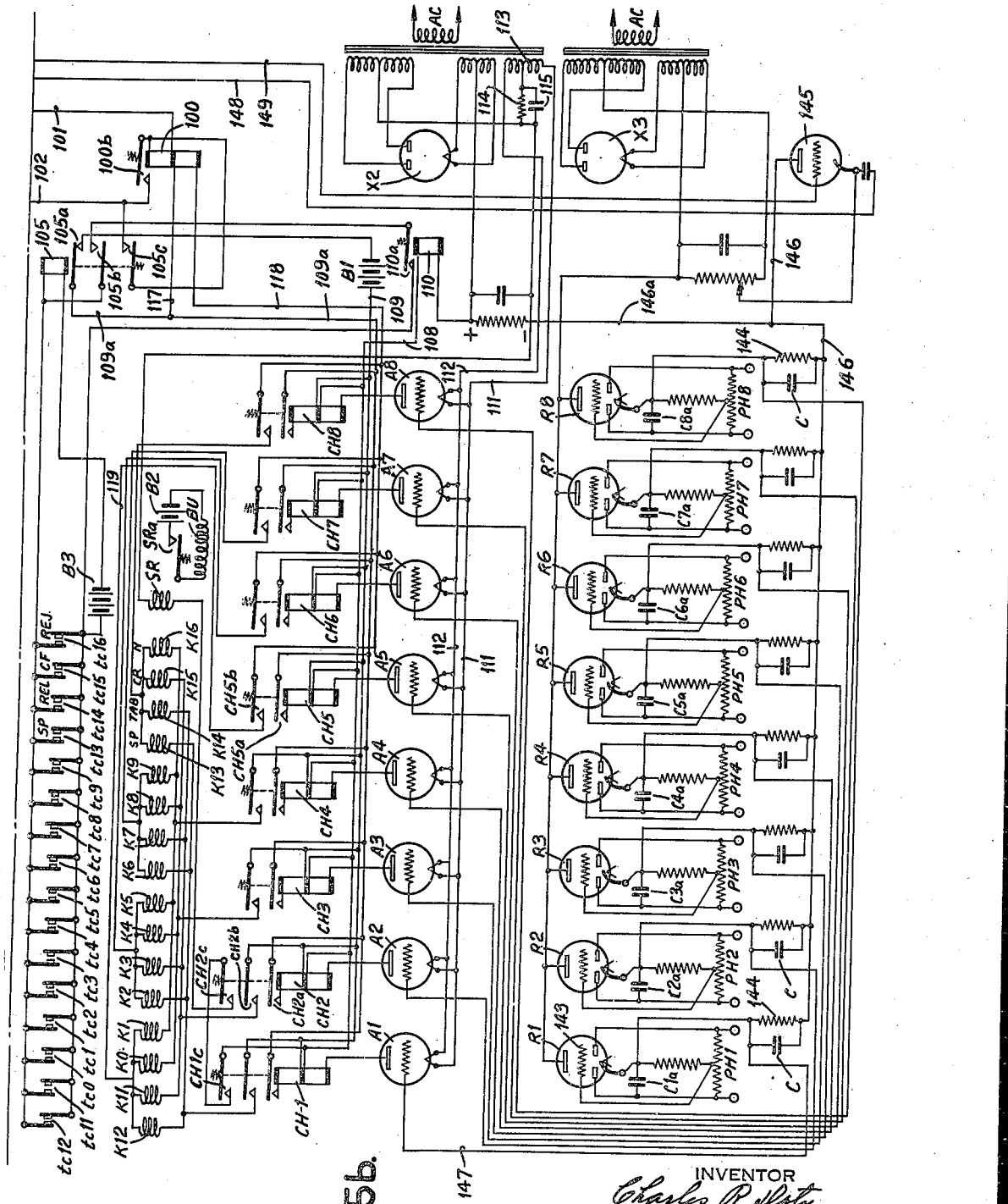

Figs. 5a, 5b form a wiring diagram of the circuits at the transmitting or controlling station.

Figs. 6a, 6b show the circuit diagram of the receiving station.

Fig. 7 is a diagram of the winding connections of a phase transformer from which eight different phases may be taken.

Figs. 8, 8a and 8b show the effect of the rectifying action of a discharge tube connected to one of the phases of the transformer.

Fig. 9 illustrates the effect of more than one signal being impressed on a line at the same time without interference with each other.

Before considering the operation of the present embodiment of the invention, a description of the various mechanisms found therein will first be given so that later, when the circuits of the system are described, the operation thereof will be more apparent.

Typewriter mechanism

For illustrative purposes, this invention is shown as embodying a well known type of recording unit at the transmitting station, which may be similar in construction to the Electromatic typewriter, shown and described in detail in U. S. Patent No. 1,777,055, and hence requires only the following brief description.

Referring to the drawings and particularly to Fig. 1, well known means are provided for actuating the type bars 16, comprising a constantly rotating roller 10, cooperating with a series of individual power units each comprising a cam 11, the engagement of the cams with the roller being controlled selectively by the character key bars 17. The operation of key bars 17 is under the control of character key solenoids such as K12. In order that the typewriter mechanism may be used for both transmitting and receiving, each character key bar is split so that the portions 17a may be depressed to operate contacts such as t12, t12a to send out a signal to the receiving station from which a check-back signal is sent back to a solenoid such as K12 for operation of key bar 17 and type bar 16 in a manner to be explained hereinafter.

Any suitable means may be provided to rotate the power roller, in the direction indicated by the arrow, which is adapted to cooperate with two rows of cam units arranged in the front and rear of the roller. The cam 11 may be provided to be pivoted on one arm of a bell crank lever 12 which is pivoted in the frame of the recording unit, as indicated generally by reference character 13, the other arm of the said bell crank lever is operatively connected with an arm of bell crank lever 14 by means of link 15. Another arm of the said lever 14 is connected to the type bars 16 in a well known manner, so as to effect operation of the type bars or any other suitable means connected to the bell crank levers upon selective operation of the controlling key bars 17.

The pivoted bell crank lever 12 is operated by the associated cam 11 whenever the latter engages the driven rollers; the engagement of the cam with the roller is controlled by means of the associated control key bar 17 in a manner which will now be briefly described.

Referring now to Fig. 2, the cams occupy normally the positions as shown in this figure, which represents one of the rear bank of the units. In this position the impeller-arm 18 is urged, by the associated coil spring 19, against one of the impeller-lugs 20, which at the time is in the lower position, and tends to turn the cam 11 in a clockwise direction. This is prevented, however, by the engagement of one of the detents 21 on the cam, with the upper stop lug 22 on the stop lever 23. If, however, the corresponding key bar is operated, the bifurcated lower end (Fig. 1) of extension arm 24 associated with one of the said key bars 17 engages an arm 25 at the upper end of the stop lever 23 which is provided with an offset projection at its end which extends laterally through an opening in the bell crank lever 12. The arm 25 of the stop lever 23 is then swung rearwardly or to the left as viewed in Fig. 1 about the pivot 26 and its lower end forwardly or to the right as viewed in this figure, thus releasing the cam, which then turns under the influence of the spring urged impeller-arm 18. In doing so the upper serrated lobe of the cam is brought into engagement with the power roller, which turns in a counterclockwise direction and therefore causes a continued rolling movement of the cam until the high point has been reached and passed. This causes the whole cam unit to swing around the pivot 13 so as to pull down the corresponding link and actuate one of the type bars or any other mechanism with which the cam unit may be connected.

After the high point of the cam is passed, the cam loses contact with the roller, but the said impeller-arm 18 tends to continue the rotation thereof by engaging the second impeller-lug 29 of cam 11 until the second detent 27 engages one of the stop lugs. Since the half rotation of the cam consumes only a small fraction of a second, it is difficult to release the key bar within this short interval, so that it is the lower lug 28 which is first engaged, but upon the release of the key bar and the return of the stop lever 23 to normal position, this lug 28 disengages the detent, whereupon the impeller-arm rotates the cam slightly, and the said detent then engages the upper stop lug 22.

It is obvious then that depression of a key bar releases the revolubly mounted cam to engage and be actuated by the power roller in turn operating the associated bell crank lever and its attached links to cause the associated mechanism such as the type bars and other operating mechanisms to be operated. It is to be understood that an individual cam unit is provided for each type bar or other functional mechanisms associated therewith.

The action of the cam mechanism has been described with respect to one of the rear bank of cam units; in the case of those of the forward bank the operation is analogous, but the directions of movement, and the order of operation of the stop lugs is reversed. For example, if the bifurcated arm 24a is positioned to engage the arm 25a at the upper end of stop lever 23a by virtue of operation of the associated key bar, the said arm is positioned rearwardly or to the left as viewed in Fig. 1, and the lower end of the stop lever 23a is moved forwardly, that is, to the right as viewed in the said figure. This said operation is effective to release the cam, by virtue of positioning the lower stop lug 28a out of the path of detent 21a, thus permitting the spring-urged impeller-arm 18a to rotate the cam slightly in a clockwise direction to effect engagement of the lower lobe of cam 11 and power roller. Upon completion of a half revolution of the cam 11, the second detent 27a engages first the upper stop lug 22a while the stop lever 23a is in an operated position, but upon release of the associated key bar and the return of the said stop lever to normal position, this lug 22a disengages the said detent and the impeller-arm rotates the cam slightly so that the said detent then engages the lower stop lug 28a, as shown in the figure. In this manner the bell crank lever 12a is rotated about the pivot 13a to operate the associated type bar or any other mechanism associated therewith.

It is apparent from Fig. 1 that the movement of the above described cam unit may be utilized to operate cam contacts such as tc11, tc12 placed in the respective paths of these cams. For further structural details of the cam units, reference should be made to the above mentioned patent.

*Punching mechanism*

At the receiving station, a recording unit consisting of punching mechanism of the type such as illustrated in U. S. Patent No. 1,914,263 to C. D. Lake et al., dated June 13, 1933, may be employed. This well known mechanism is adapted to perforate various digit positions of a multi-column record card to effect a permanent record thereon which may be later used in compiling statistical reports of varied nature which may be required for the proper running of a business. In view of the widespread use of this type of punching apparatus, only a brief description is deemed necessary.

Figure 4:
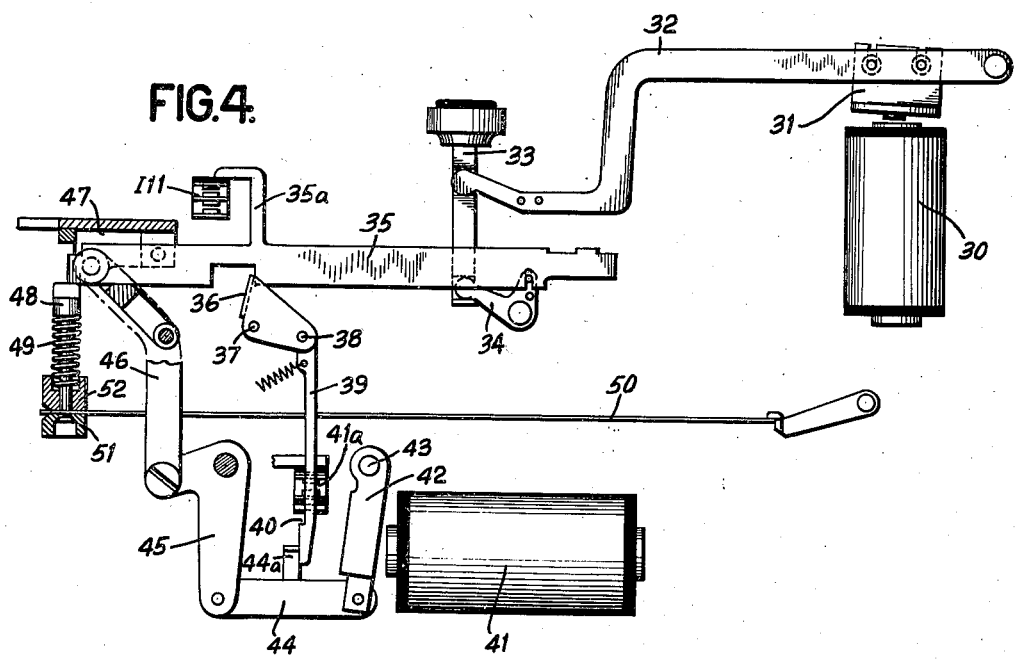
Fig. 4 is a sectional view showing the operating mechanism associated with a key lever.

It will be noted in Fig. 4 that a magnet 30 is provided with an armature 31, the operation of which by the magnet causes movement of a key lever 32 to depress a key 33. A magnet such as 30 and a key such as 33 are provided for the 12, 11, 0, 1, 2, 3, 4, 5, 6, 7, 8 and 9 index positions, so that by selective operation of the magnets 30 the proper digit key may be depressed to effect a punching operation in the following manner: As key 33 is depressed, it causes a bell crank 34 to be rocked in a counterclockwise direction. This bell crank has connection with an interposer 35 in such a manner that the clockwise rotation of the bell crank causes the interposer to be moved forward or to the left as viewed in Fig. 4. A bail 36 lies in the path of the forward movement of interposer 35 so that it is rocked counterclockwise about its pivot shaft 37. This bail has a connection 38 with a contact operating lever 39, so that counterclockwise rotation of the bail causes the lever 39 to be raised. A hook 40 on the lower end of this lever engages the lower strap of a set of contacts 41a and effects a closing of these contacts upon its upward movement. Closing of the contacts 41a energizes punch magnet 41, thereby causing its armature 42 to be attracted. The armature 42 is pivoted at the upper end 43 and has its lower end connected to a train of linkage including link 44, bell crank 45 and link 46, so that the movement of the armature is transmitted to a motor bar 47 operatively connected to the link 46 so as to rock bar 47 downwardly. Meanwhile, the interposer 35 has moved out over its corresponding punch 48 and now lies in the path of the downward movement of the motor bar 47, so as to cause the depression of the punch 48 for perforating a record card 50 which is resting between the die 51 and the stripper 52. During the attraction of the armature 42, just as the armature reaches its limit of travel toward the magnet 41, a knock-off lever 44a which is adjustably fastened to link 44 strikes against the lower end of lever 39 to cause hook 40 to be released from its engagement with the lower strap of the contacts 41a so as to permit these contacts to open and deenergize the magnet.

The interposers 35 are provided with contact operating projections 35a which are each arranged to operate a group of contacts such as I11 upon a downward movement of the interposer when operated by the motor bar. Thus, it is seen that these contacts are only operated if there is an actual punching operation effected, and these contacts close various circuits which permit check-back signals to be set up in a manner which will be described later in connection with the explanation of the circuits of the system.

After the record card 50 has been perforated in the proper index positions in all of its data receiving columns and has been released to the last column position, it is arranged to be ejected by gripper jaws 55 in the manner well known in the art. These jaws are mounted on a shaft 56 and are arranged to swing in an arc on this shaft in a counter-clockwise direction so as to attempt to deposit the card in section B of the receiving hopper 60. Shaft 56 has gear connection 57 with a shaft 58 normally connected through bevel gearing 59, 59a to a shaft 61. The gear connections are such that the movement of the gripper jaws 55 in carrying the card over to section B of the hopper 60 causes the rotation of shaft 61 and fingers 62 attached thereto to be effected promptly in such a manner that the fingers 62 are moved into position to receive the card as it arrives over section B of the hopper. Then, upon the return stroke of the gripper jaws 55 to their normal latched position, which movement accompanies the feeding of a new card into the punch in a manner common and well known in the art, the shaft 61 is rotated quickly to its normal position and fingers 62 carry the card over to section A of the hopper 60. The operation just described assumes that the card has been correctly punched.

Now consider the effect of an incorrectly punched card which has been recognized by the system. When an error is made in the punching of a card, a reject signal is sent over a circuit to be described later to energize a magnet 65. The energized magnet 65 attracts its armature 66 which then causes closing of contacts REJ and the movement to the left of the lower portion of an operating arm 67. Arm 67 is pivoted at 68 and is formed with a lower portion adapted to fit in a groove of the hub of gear 59a so as to cause gear 59a to be moved out of mesh with gear 59 when armature 66 is in its attracted position. When the reject signals from the transmitter cease, magnet 65 will become deenergized causing armature 66 to assume its normal position under the biasing action of spring 66a and permit contacts REJ to open, so that no further check-back signals will be sent. The disengagement of the gearing connection 59, 59a will cause arm 62 to remain in the position shown at all times and, when the card gripper jaws 55 swing the card over to section B of hopper 60, the card will be deposited there and will thus be separated from the correct cards which are placed in section A of the hopper as previously described.

Gears 59, 59a will remain disengaged until a new card has been completely fed into the punch. They are held in this position by reason of the fact that the upper end of arm 67 becomes latched on a latch point 71a of an armature lever 71 which is adapted to be operated by a magnet 70. A set of contacts 69 (see Fig. 6a) are suitably placed so as to be closed by the card feed rack 54 when a card is completely fed into the first column punching position to cause energization of magnet 70 and hence counterclockwise rotation of armature 71 to release the arm 67 from the latch point 71a, thereby to permit gears 59, 59a to establish their normal operating connection.

When the punch is being operated independently, provision is made for duplicating information from a master card 50' placed in position on master card table 85 and held in position beneath a contact 84 which is normally secured by a latch 84a. A housing generally designated H forms a support for a contact roll 90 which is located directly over reading brushes 12 to 9. Brush F feeds the contact roll at all times whether there is a card on the master card table or not, but the other brushes are isolated except where there is a hole in the record card in corresponding index point position.

For further and more detailed description of the above punching mechanism, reference should be made to the aforementioned patent.

*Punching circuits.*—Circuits of the punch machine are of the usual type used in connection with preparing cards for Hollerith accounting machines with the exception that a multi-contact relay MCR is provided. This relay is energized by an obvious circuit across the line and switch 75 is thrown to the "on" position (Fig. 6a), in which position it is maintained during the operation of the system. The sole purpose of switch 75 is to permit the punching machine to be available for use independently of the system whenever this is desirable by simply opening the switch. Energization of relay magnet MCR effects operation of contacts MCR12 to 9 and a to d so that they assume positions just opposite to that shown in Fig. 6a.

Assume as a starting point that a card has just been ejected by the gripper jaws 55. A circuit will then be completed to permit a card feed cycle to be initiated as follows: one side of the line 72, contact 77 which has closed after the last column punching position, auto start contacts 78, which are closed when the gripper jaws swing over to deposit the card in hopper 60, trip magnet 79, safety contact 76, to the other side of line 73. The purpose of the safety contact 76 is simply to provide an interlock between certain operating circuits of the punch. Energization of the trip magnet 79 causes contact 79a to open and 79b to close, thus completing an obvious circuit to the drive motor 80 causing the motor to be effective to drive the machine through a card feed cycle.

Just after the start of the feed cycle, contacts 77 open and contacts 81 are arranged to close so that a circuit may be prepared for completion when the contacts 79a are tripped closed by the drive mechanism near the end of the feed cycle as follows: line 72, contacts 79a, contacts 81, brush magnet 82, contacts 83 closed by the contact door 84, to line 73. It will be noted that contacts 77 also control eject magnet 74 and provide a circuit for this magnet during the eject operation which is completed through CF1 when the card feed control magnet CF is energized by a signal from the controlling station. Thus, when contacts 77 open, eject magnet 74 is deenergized and permits gripper jaws 55 to assume their normal lax position.

When the feed cycle is completed and the card is in its first column punching position, the brush magnet 82 has been deenergized by the circuit already described and the reading brushes are raised up so as to make contact through any hole in the master card which may appear in the first column. If switch 75 is open, duplicating circuit may then be completed as follows: line 72, contacts 79a, floating cam contacts 87a, common brush F, contact roll 90, individual reading brush corresponding to the hole in the card in the first column, corresponding one of the duplicating magnets generally designated 30, through either the a, c or e contacts of relay RCR, wire 86, contacts MCRc, to line 73. This circuit is broken after the punching operation by the opening of contacts 87a, the cam 87 being rocked in the course of the escapement of the card to the next position so as to cause contacts 87a to open for a brief but sufficient interval.

Assuming switch 75 to be closed, however, as it is under normal operation of the system, the duplicating circuit is prevented because record card relay RCR is picked up when a card is in the bed of the punch, thus causing its contacts a, c and e to open and b, d and f to close. The circuit which energizes relay magnet RCR is from line 72, card contacts 88 which close when a card is fed into the punch bed, magnet RCR, contacts MCRa, now closed, resistance panel O to line 73.

The actual circuit which causes the perforation in the card is traceable from line 72, contact 79a, conductor 89, contacts 41a which are closed upon depression of a key in the manner described previously herein, punch magnet 41 to line 73. It will be noted that contacts 41a are provided with a shunt circuit comprising space contacts SP1 which are closed whenever a space signal energizes space magnet SP. The closing of contacts SP1 energizes the punch magnet but, since no punch interposer has been operated, no punching will occur, the result being simply that the card is spaced one column.

Phase transformers

Referring to Fig. 7, it will be noted that the action of the phase transformer shown in that figure is to take single phase synchronous alternating current and subdivide the same until as many equally spaced phases as may be required by the system. In the present embodiment eight such phases are arranged to be supplied by each transformer. Transformers of this type are provided at both transmitting and receiving stations and are adapted to be connected to various tube circuits at these stations for the purpose of supplying them with electrical energy of different phase relationships. The internal connections of the transformers are not shown but may be of the type explained in detail in U. S. Patent No. 2,153,178 to Clyde J. Fitch, dated April 4, 1939. The turns ratio of the windings are such that the voltages delivered across the free ends of the secondary circuits are equal. For purposes of illustration, eight such secondary circuits are provided and are designated PH1 to PH8. Different phase sine wave currents are taken off the various phase connection outlets of the secondary transformer for transmitting purposes but it is obvious that a plurality of, let us say, sixty cycle sine waves cannot be transmitted simultaneously over the working channel of a single network to effect the various required operations of the system. In order to overcome this difficulty, the wave shapes similar to that of a sine wave are changed to the forms illustrated in Fig. 9, one method of which will now be described.

Wave form modifying circuits

Referring now to Fig. 8, a sinusoidal wave form of alternating current is shown and is similar to the current wave forms developed by each of the plurality of secondary circuits of the phase transformer. These sinusoidal current waves may then be impressed upon any type of full wave rectifier to change the shape of the current waves to conform to that shown in Fig. 8a which is representative of a pulsating current wave form. In turn, the rectified current wave may then be applied as follows: If the voltage rectified wave form shown in Fig. 8a is impressed on the grid of a thermionic tube, for example, and the voltage is sufficient to drive the tube far below its plate current cut-off point, the shape of the current wave in the plate circuit will be altered to conform to the shape shown in Fig. 8b. The characteristics of the circuits may be selected and adjusted so that the length of the base of the short impulses shown in Fig. 8b is approximately ⅛ of the distance between the impulses. Of course, it is obvious that the particular wave shapes may vary according to the characteristics of the circuits employed, and it is very evident by the method just described or by the conversions based upon the same principles that many different wave shapes of the resultant current may be obtained. Accordingly, a preferred method is given.

In further explanation of the principle of wave conversion just described, this entire action may take place automatically in a single thermionic tube of a type well known in the art comprising a combination of a full wave rectifier and triode in one envelope. The electrical connections for this type of tube may be as shown in the wiring diagrams for tubes S1—8, R1—8, S'1—8 and R'1—8. It will be noted that the alternating voltage of the sinusoidal wave is applied across a center tapped resistor 131 (Fig. 5a). In each of the tube circuits (see tube S1) the wave shape of the current flowing through this resistor or the voltage across it assimilates a wave form similar to that shown in Fig. 8. A resistor 132 is connected between the cathode of the tube and the center tap of resistor 131, the terminals of which are connected to the two rectifier plates 129, 130 of the said tube. Therefore, the wave shape of the rectified current through resistor 132 and the voltage across this resistor becomes similar to that shown by the pulsating wave in Fig. 8a. The grid 133 of the tube may also be connected to the center tap of resistor 131, the grid being normally at zero bias due to the fact that no current is passing through resistor 132. Then, the voltage across resistor 132 may be applied between the grid and cathode of said tube.

If the said voltage is of sufficient value, the tube may be driven far below its plate current cut-off point to obtain a plate current having the wave shape similar to that shown in Fig. 8b. This is impressed accordingly on a connected output circuit of the tube which will be described later in connection with the general circuits of the system. Any suitable form of direct current supply such as provided by rectifiers X1—3 at the transmitting station and X4—6 at the receiving station may be employed for supplying electrical energy to the plate circuit of the signaling tubes. The negative terminal of the rectifier tubes is connected directly to the cathode of the signaling tubes and current flows through the plate circuit upon operation of the various character sending key contacts in the circuit which will be described later. This current flow lasts for only a comparatively short time, however, because the bias on the grid is not a constant factor but varies in timed relationship with the frequency of the A. C. supply coming from the secondary of the phase transformer. The said supply is impressed upon the full wave rectifying portion of the tube. The rectified voltage impressed across resistor 132 immediately drives the grid sufficiently negative to prevent further flow of plate current. Thus, the plate current is reduced to a substantially zero value. At such times when the rectified voltage passes through zero, a pulse is impressed upon the output circuit of the triode. This pulse is utilized as a signal and is sent from the transmitter to the receiver to effect operation of the punch mechanism at the receiver.

From the foregoing description it will be understood that, if eight separate phases spaced 22½ electrical degrees apart are taken off the secondary phase transformer and connected to eight electrical circuits each embodying a tube of the type just described, so that the terminals of the separate resistors 131 are joined with the terminals of the secondary windings of each phase, eight series of short impulses similar to those illustrated in Fig. 9 may be generated. It will be noted that no two impulses overlap or occur at the same time, and therefore it is possible that all eight of these phases may be transmitted over a single carrier simultaneously.

Referring now to the receiving tubes R1—8 (Fig. 5b), and R'1—8 (Fig. 6b), it will be noted that the circuits for these tubes are similar to the ones described above. Taking tube R1 as an example, it will be assumed that this tube is connected to phase PH1 of the transformer, and that the grid 143 of this tube is connected in the cathode circuit of the tube and is arranged to be normally biased to cut-off. The negative terminal of the supply source coming from the rectifier tube X3 is connected to one side of a resistance 144 and a condenser C, each of which leads to the cathode circuit of tube R1 and also to the grid of tube A1. The positive potential of the same supply source is applied to the anode of tube R1. When the check-back signal is received, it is impressed upon a high biased tube 145 and then sent through conductor 146 to the circuits embodying tube R1. Condenser C becomes charged and thus controls the actuation of the grid of an amplifying tube A1 to which it is connected by conductor 147 in such a manner that if the phase relationship of the signal is the same as PH1, the tube A1 is triggered off and a virtually steady current flows through its plate circuit to effect energization of the check-back relay CH1. It will be noted that tube A1, normally inoperative, becomes operative only upon reception of a signal of a phase corresponding to PH1. The signal phase and the tube circuit phase must agree in order that the amplifier tube A1 may be operated, since the bias placed on the grid of tube A1 by each of these supply sources individually is insufficient to cause current flow through the windings of check-back magnet CH1.

*General circuits*

In the present embodiment of the invention as illustrated in the wiring diagrams, 16 groups of typewriter control contacts t0—16 are provided for transmission purposes. Each of these is operated upon depression of the corresponding typewriter key as previously described. To avoid the possibility of sending duplicate signals and to prevent holding the contact assemblies closed for a shorter or longer time than is necessary for the proper functioning of a complete cycle, locking relays r0—16 are employed and are operated under control of their related contact groups through obvious circuits including the battery B. For example, relay r12 is energized under control of contacts t12a, relay r11 under control of contacts t11a, etc. These contacts must be opened after one complete cycle of operation of the system has occurred before any further signals may be sent to the line. Accordingly, the circuit which provides for the energization of relays r11, r12, etc. includes normally closed contacts 100a and error switch ER, either of which when open insures the deenergization of these relays regardless of whether or not the typewriter key remains depressed. Relay 100 (Fig. 5b) is operated on chack-back signals only as will be explained hereinafter, and when these signals are completed it will assume its normal position once again. A separate holding winding is provided for relay 100 and is shown as the upper portion of the coil of this relay. Thus, as long as any one of the contacts t12, t11, etc. remains closed, relay 100 remains energized and none of the relays r12, r11, etc. can be operated. Specifically, the holding circuit for relay 100 is traceable from positive side of battery B, wire 101, coil 100 (Fig. 5b), contacts 100b now closed, wire 102, contacts t12 to the negative side of battery B.

Signal contacts designated SIG are free to be used at any time for special signaling purposes and the circuit is not subject to any particular limitation for this purpose. Closing of contacts SIG connects the plates of tubes S1 and S2 to the upper left-hand coil of line transformer L1 so that signals from these tubes may be impressed on the line. Because of the nature of this circuit, which will be explained in detail later, communication may be carried on easily in dots and dashes. The remaining sets of contacts extend in a row to the left of contacts SIG and are operated by the relays r12, r11, etc. to effect closing of the plate circuits of tubes S1—8 through the plate-connected winding of the transformer L1 to positive side of the supply through rectifier tube X1.

The circuit connections between contacts r12, r11, etc. and tubes S1—8 are according to a predetermined code, an example of which is submitted in the table below:

| | | | |
|---|---|---|---|
| 12—S1 and S5 | | 4—S3 and S6 | |
| 11—S2 and S5 | | 5—S4 and S6 | |
| 0—S3 and S5 | | 6—S1 and S7 | |
| 1—S4 and S5 | | 7—S2 and S7 | |
| 2—S1 and S6 | | 8—S3 and S7 | |
| 3—S2 and S6 | | 9—S4 and S7 | |

| | |
|---|---|
| Space | S1 and S8 |
| Release | S2 and S8 |
| Card feed | S3 and S8 |
| Reject | S4 and S8 |
| Signal | S1 and S2 |

Once these tubes have been operated, impulses are sent to the transformer L1 and impressed on the transmission line in order that they may be communicated to the receiver. It will be noted that condensers C1 to C8 are supplied on one side of the cathode circuit of the rectifying portion of tubes S1—8. These condensers are of such a capacity as to suppress alternate half cycles of the sine wave currents coming from the secondary circuits of the phase transformer and thus only every other impulse peak becomes effective.

At the receiving station the incoming impulses are taken off the line through transformer L2 and pass through the upper secondary winding of this transformer to be impressed between the grid and cathode of tube 155 which is normally biased to cut-off and normally allows no current to pass through resistors 144' of the R'1—8 tubes. The pulses will cause the discharge of tube 155 and allow current to charge the particular condensers C' which are in circuits supplied with the same phase current as the incoming signals. Tubes A'1—8 are also normally biased to cut-off but as a result of the charging of condenser C' and the subsequent discharge thereof through resistance 144' the grids of corresponding tubes A'1—8 will be actuated to cause plate current to flow. Capacitances in the form of condensers C'1—8 have been connected from cathode to one plate of each of the R'1—8 tubes to allow only every other impulse to appear on the grid of the related tubes A'1—8 in a manner similar to the suppressing of alternate impulses at the transmitter.

Assume a card is in punching position at the time, punch control relays P2 and 5, for example, will operate to close a circuit to the 11th position key magnet 30. This will position the 11 interposer under the motor bar in a manner already described in connection with the punching mechanism to close the 11th position interposer contact assembly I11. The closing of contacts I11 (Fig. 6b) closes the plate circuits of tubes S'2 and S'5 to the lower secondary winding of line transformer L2. The source of potential for this plate circuit is supplied through the rectifier tube X6 and its associated circuits, and connections are made from the tube S'1—8 to the proper secondary connections of one of the phase transformers in the manner already described.

It will be noted that capacity is placed between the cathode in one plate of tubes S'1—8 but on the opposite side of the cathode from that of the receiving tubes. Thus, when the impulses are impressed on the line through transformer L2, alternate impulses will be suppressed on opposite half cycles of the sine wave with respect to the signals coming from the transmitting station to the receiving station, so as to send the signals simultaneously in either direction over the line. It is to be appreciated that the code for return signals may be made different from that used for original transmission, that is, if tubes S2 and S5 are energized for an 11 key depression on the original transmission then perhaps tubes S'3 and S'4 might be energized to represent the same character on return transmission. For diagrammatic simplicity, however, the same code signals are shown in both instances.

The check-back signals upon arriving at the transmitting station pass through the lower left-hand winding of line transformer L1 and are then impressed on highly biased tube 145 to which the transformer winding is connected by conductors 148, 149 (Fig. 5b) so as to render the tubes R2 and R5 effective to cause a discharge of tubes A2 and A5 for the purpose of energizing check-back relays CH2 and CH5 connected thereto in a manner similar to that which has been described previously herein. The energization of relay CH2 and CH5 causes typewriter key solenoid 11 to be energized to depress the 11th position key lever connected to the armature thereof and to thereby cause a recording operation in a manner described in connection with the typewriting mechanism. The various circuits are traceable as follows: from plates of tubes A2 and A5 through CH2 and CH5, respectively, wire 108, magnet 110, to plus terminal of source of supply from rectifier tube X2. It will be noted that the cathodes of these tubes are connected through a winding 113 and a resistance 114 and a condenser 115 to the negative terminal of the same source of supply, thus causing a complete circuit in which current flows when the bias is removed from the grids of the tubes under the influence of the incoming check-back signals in a previously explained manner. Relay magnets 110, CH2, and CH5 become energized and contacts CH2a and CH5a close to provide holding circuits for the latter two relays which include conductors 109 and 109a, battery B1, and relay contacts 105a. Magnet 110 is closed only when check-back impulses are being received. Contacts CH2b and CH5b now close to provide a circuit through the typewriter key magnet K11 from negative side of battery B1, contacts 105a, conductors 109a and 117 to relay magnet 100, conductor 118 to contacts CH5b now closed, conductor 119, magnet K11, contacts CH2b also now closed, conductor 109, to positive side of battery B1. This circuit picks up relay 100 to prevent any more signals from being sent from the transmitting typewriter contacts at this time due to the opening contacts 100a (Fig. 5a) as previously described. The 11th position key of the typewriter is now pulled down by the action of key magnet K11 to effect a recording. The typewriter cam 11 corresponding to this key is thus actuated to close contacts tc11 (at top of Fig. 5b) for a brief interval. Magnet 105 becomes energized by a circuit including contacts tc11 now closed and battery B3. The holding circuit for magnet 105 is through its contacts 105b now closed and contacts 110a which are also closed at this time but not for long since as soon as the plate current stops flowing from tubes A2 and A5 in the example assumed, magnet 100 becomes deenergized if contacts t11 are open. Contacts 105a now open to deenergize the magnets CH2 and CH5. This will drop out magnet 100 if contacts t11 are open and permit another signal to be sent out over the line from the sending contacts t12, 11, etc. If contacts t11 have remained closed, however, magnet 100 is maintained energized through contacts 105c now closed. When contacts t11 are released and no further signals are sent over the line, magnet 110 becomes deenergized to break the circuit to magnet 105, thus causing opening of contacts 105c and deenergization of magnet 100. The system is now in its original normal condition ready to transmit another data character signal.

Thus, it is seen that an operator at the transmitting station may depress, say, the 11 key and then watch the typewriter actually print the character as the check-back signal arrives to signify the fact that this character has been punched at the receiving station.

For special signaling, the operator manually closes contacts SIG (Fig. 5a) to close the plate circuits of tubes S1 and S2 to the line. This signal upon arriving at the receiver causes tubes A'1 and A'2 to discharge and energize magnets P1 and P2, respectively. Contacts P1b and P2b complete a circuit to the signal relay SR' thereby causing contacts SR'a to close and complete a circuit from battery B4 through buzzer relay BU'. Contacts SR'b also close at this time and connect tubes S'1 and S'2 for transmission of the signal back to the transmitting station where reception of the signal causes tubes A1 and A2 to discharge and energize magnets CH1 and CH2. Contacts CH1c and CH2c then close to provide a circuit through signal relay magnet SR to cause contacts SRa to pick up and energize buzzer magnet BU from battery B2. It will be remembered that the return transmission is over the same line and occurs concurrently with the original transmission so that the operator hears his signal return almost instantaneously and thus there is no mistake as to the character of the signal. The same is true when the attendant at the remote station wishes to signal the operator at the transmitting station. Thus signals may be sent to convey a message in accordance with any desired dot-dash code at any time without affecting any of the normal operating circuits of the system.

*Special control circuits*

In order that the punching machine at the secondary station may be entirely remotely controlled from the primary station, special circuits are provided for controlling card feed, space, release, and reject operations which have already been referred to hereinbefore but will be considered more in detail at this point for the sake of clarity.

The circuit which actually causes spacing of the punching machine has already been described under the heading of "Punch circuits." This circuit, it will be remembered, passed through a contact SP1 which was closed upon reception of a space signal to shunt out contacts 41a and thereby energize the punch magnet 41 to effect spacing of the card one column. The manner employed in sending a space signal from the primary station (Fig. 5a) is similar to that for sending any other signal. Depression of the proper typewriter key causes energization of its associated magnet r13 which in turn closes contacts r13b to complete the plate circuits of tubes S1 and S8 to the line transformer L1. Referring to Figs. 6a, 6b, the impulses from tubes S1 and S8 will cause R'1, R'8 and A'1 and A'8 to be actuated so as to energize punch control magnets P1 and P8. A circuit from line 73, resistance panel O, left and center contacts b, now closed, wire 76, contacts P1a, now closed, space magnet SP, contacts P8a now closed, to the other side of the line 72, provides for energization of space magnet SP. Contacts I13 are closed upon energization of magnet SP causing the plate circuits of tubes S'1 and S'8 to be completed to line transformer L12. Check-back impulses are sent to the primary station to actuate tubes R1, R8 and A1, A8 which in turn cause operation of typewriter space key solenoid K13 for spacing the typewriter one position.

Figure 3:
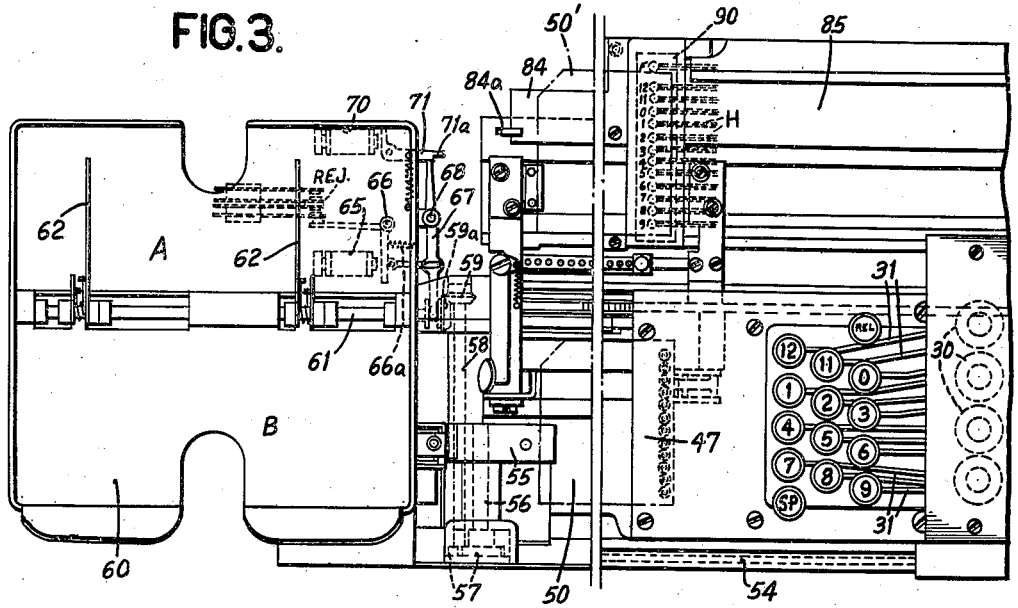
Fig. 3 is a plan view of a well-known type of punching mechanism located at the receiving station and is broken through the center so as to include more of the important elements of structure in a smaller space.

Release key REL (Fig. 3) is depressed to effect a release of the card in the punch from any position in which it is at the time of such depression to the last column position. At the primary station in order to cause depression of key REL at the secondary station, contacts r14b are operated upon depression of their related typewriter key in a manner similar to that previously described, and signals are sent out from tubes S2 and S8. These signals, accordingly, operate tubes R'2 to 8 and A'2 to 8 to cause energization of release magnet REL. A check-back signal is set up by contacts 114, which close upon energization of magnet REL, to cause tubes S'2 and 8 to become operative. At the primary station, magnets CH2 and 8 are energized in the customary way to energize in turn TAB magnet K14 of the typewriter which causes the paper to be skipped a predetermined number of columns according to the setting of various TAB stops, or, if such stops are not provided, to skip entirely across the paper.

A card feeding operation is effected by a coded signal from tubes S3 and S6 in a similar manner to actuate punch control relays P3 and P8 at the secondary station to close a circuit through magnet CF. Energization of magnet CF causes contacts CF1 (upper right-hand corner of Fig. 6a) to close and provide a circuit through magnet 74, and contacts 77 to line 72. Energization of magnet 74 releases gripper jaws 55 of the punch permitting them to swing over to deposit a card, if any is present, from the bed of the punch to the hopper and to actuate contacts 78 and magnet 79 as previously described to energize motor M for effecting a card feed cycle to feed a new card into its first column punching position. Contacts I15 are arranged to be operated by the motor drive trip mechanism to send a check-back signal to the primary station to energize the carriage return relay CR.

When an error is made or a check-back signal fails to appear, the proper procedure is to depress the reject key of the typewriter to close contacts r15b for coupling up tubes S4 and S8 with the line transformer to send a reject signal to the secondary station. Energization of punch control magnets P4 and P8 is effected in accordance with the reject signal and a circuit is completed through contacts operated by these magnets to energize magnet REJ and cause the eject mechanism of the punch to be prepared to eject the card into section B rather than section A of the hopper as previously described. A check-back signal set up by contacts I16 when magnet REJ is energized effects energization of typewriter key solenoid K16 at the primary station to cause printing of an "N" on the paper. The release key REL is then depressed to allow the card to move out beyond the last column position and, finally, card feed key CF is operated to cause the card to be deposited in section B of the hopper and a new card to be fed in.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a system of the class described, a primary station comprising means to generate different phase current impulses, means included in the generating means for suppressing predetermined portions of the wave forms of said impulses, means for selecting groups of said different phase impulses to represent data characters, means for impressing said impulse groups on a transmission line for transmission in one direction, and data varifying means including impulse receiving means and data recording means; and a secondary station comprising punching means selectively responsive to predetermined groups of said impulses for punching data in a record card, means rendered effective upon operation of the punching means to send different phase impulses over the same transmission line in the opposite direction to cause operation of the receiving means of the primary station so as to effect a recording of the data punched at the secondary station, and means cooperating with the latter impulse sending means for suppressing other predetermined portions of the impulse wave forms so as to permit two-way transmission on said line without interference.

2. In a system of the class described, a primary station comprising means to generate sine waves of current of different phase relationships and to modify said waves into a series of repeating impulses, the modifying means including means for suppressing alternate half cycles of said sine waves, means for selecting a different series of said impulses according to a preselected code to represent data characters including means for sending said impulses over a transmission line, and data verifying means including impulse receiving means and data recording means; and a secondary station comprising a plurality of punching elements for punching the data in a record card, means responsive to the coded series of impulses for selecting said element for operation, means actuated in accordance with the operation of a punching element during a punching operation to initiate a further series of different phase impulses indicative of the punched data including means to suppress different alternate half cycles of the wave forms of the latter impulses and means to impress said last mentioned impulses on the transmission line without causing interference with the impulses being sent from the primary station to cause operation of the impulse receiving means at the primary station, thereby operating the data recording means to record the data punched at the secondary station.

3. In combination, a plurality of punching elements and individual operating means therefor for punching data representations in a record card, means for selecting said punching elements for operation in accordance with the data representations including means comprising a plurality of electronic discharge tubes in systematic arrangement for generating impulses of current waves of different phase relationships, means included in said arrangement for suppressing predetermined sections of said waves, means for selecting said different individual operating means for operation responsive to different coded phase combinations of said impulses to cause punching of the data in the record card, means including other systematically arranged discharge tubes controlled by the selected operating means in the course of a punching operation to set up further different phase impulses according to a preselected code to represent the punched data, and means associated with the latter tubes for suppressing different predetermined sections of the latter impulses to differentiate from the first mentioned impulses.

4. In a system of the class described, a primary station comprising means to generate current waves of different phase relationships including electronic tube circuits for modifying the shapes of said waves so as to form a series of repeating impulses by utilizing predetermined portions of the waves, means for selecting different series of said impulses according to a preselected code to represent data characters including means for sending said impulses over a transmission line, and data verifying means including a plurality of electronic tubes in a predetermined arrangement and data recording means, and a secondary station comprising a plurality of punching elements for punching the data in a record card, means responsive to the coded series of impulses for selecting said elements for operation, and means controlled in accordance with the operation of a punching element during a punching operation to generate further waves of different phase relationships including electronic tube circuits for modifying the shapes of the last mentioned waves so as to form series of repeating impulses from other portions of said last mentioned waves that were different from those portions utilized by the first mentioned waves to represent the punched data, means to impress the last mentioned impulses on the transmission line to effect selective operation of the tubes of the data verifying means at the primary station for operating the data recording means to record the data punched at the secondary station, said last mentioned impulses being from different portions of the waves than the first mentioned impulses and thereby preventing line interference during two-way impulse transmission.

5. In a remotely controlled punching system including a primary station and a secondary station, means at the primary station for sending out data impulses and control impulses, means at the secondary station responsive to the data impulses for punching the data in a record card, ejecting means operated in accordance with one of the control impulses and effective upon completion of punching for normally ejecting the card into a predetermined receiver, means effective under control of another of said control impulses denoting an error in card whether before or after complete punching of the card for causing the ejecting means to deposit the card in another predetermined card receiver.

6. In a system of the class described including a controlling station and a remote station, means at the controlling station for sending out signals including control means for determining the duration of said signal waves to cause them to assimilate dots and dashes, means for suppressing alternate half cycles of said waves, means at the remote station responsive to said signals for manifesting the information represented by said signals, means controlled by the manifesting means for initiating and sending similarly shaped signal waves back to the primary station, means for suppressing alternate half cycles of the last mentioned waves different from the half cycles suppressed at the controlling station to prevent interference on concurrent two-way transmission, and means at the controlling station responsive to the return signals for manifesting said signals at said controlling station to provide a check on the accuracy of the system.

7. In a system of the class described including a controlling station and a remote station, means at the controlling station for sending data signals and control signals of predetermined characteristics, punching mechanism at the remote station responsive to said data signals in accordance with said characteristics for punching data perforations in a record card, means responsive to one of said control signals immediately to release the card from punching position, data recording means for recording data on a sheet at the primary station, and means controlled by the last-mentioned means for sending a control signal back to the primary station to cause said data recording means to be actuated in a manner indicative of the card release at the remote station.

8. The system defined in claim 7 including card feeding means at the remote station responsive to another of the control signals for feeding another record card into punching position, and means actuated as an incident to operation of the card feeding means for sending a signal back to the primary station to actuate the data recording means in a manner indicative of a card feeding operation at the remote station.

9. The system defined in claim 7 including card spacing means at the remote station responsive to another of said control signals for spacing the card to a new punching position, and means actuated as an incident to the spacing of the card for sending a control signal back to the primary station to cause corresponding spacing of the sheet in the data recording means.

10. In a remotely controlled data punching system including a controlling station and a remote station, means at the remote station for punching a record card with perforations representing data, means at the controlling station for transmitting data signals and control signals of a predetermined nature, means responsive to said data signals for causing the punching means to become effective to perforate the card in accordance with the nature of the data, means responsive to the control signals for controlling the disposition of the record card with respect to the punching means in accordance with the nature of said control signals, and means responsive to the last named means for sending check-back signals to the controlling station indicative of the control of the record card effected at the remote station.

CHARLES R. DOTY.